United States Patent Office 3,560,474
Patented Feb. 2, 1971

3,560,474
**METHOD OF POLYMERIZATION OF ISOBUTYL-
ENE UTILIZING AlBr₃ OR AlI₃ WITH AN ACTI-
VATING COMPOUND**
Miroslav Chmelíř and Miroslav Marek, both of
23 Vratislavova, Prague 2, Czechoslovakia
No Drawing. Continuation-in-part of application Ser. No.
703,882, Feb. 8, 1968, which is a continuation-in-part
of application Ser. No. 621,454, Mar. 8, 1967. This application May 14, 1969, Ser. No. 824,660
Claims priority, application Czechoslovakia,
Mar. 11, 1966, 1,652/66
Int. Cl. C08f 3/14
U.S. Cl. 260—94.8                7 Claims

ABSTRACT OF THE DISCLOSURE

Isobutylene is polymerized rapidly in the presence of aluminum bromide or aluminum iodide as a catalyst and in the simultaneous presence of an activating compound such as $TiCl_4$, $TiBr_4$, $VCl_4$, $SbCl_5$, $SnCl_4$, $GaCl_3$, $BF_3$ or $BrI$ even if the amount of the activating compound is too small to cause polymerization on its own in the absence of a co-catalyst which forms a Lewis acid with the activating compound, and if the polymerization zone is free from such a co-catalyst. $AlBr_3$ or $AlI_3$ is consumed during polymerization, thus permitting the polymerization to be controlled by gradual addition of minute amounts of the aluminum halide.

REFERENCE TO RELATED APPLICATIONS

This application is a continuation-in-part of our co-pending application Ser. No. 703,882, filed Feb. 8, 1968, now abandoned which in turn is a continuation-in-part of the abandoned application Ser. No. 621,454, filed Mar. 8, 1967.

BACKGROUND OF THE INVENTION

This invention relates to the polymerization of isobutylene, and particularly to catalysts and catalyst systems for use in the polymerization of isobutylene.

It is known that a group of halides which are effective catalysts in the Friedel-Crafts reaction also promote the polymerization if isobutylene. It was thought that a co-catalyst capable of forming a Lewis acid with the halide was necessary, but it has been found more recently that the aluminum halides catalytically promote the polymerization of isobutylene even in the absence of a co-catalyst (Beard et al., J.A.C.S. 1964, 2566; Chmelir et al., International Symposium on Macromolecular Chemistry, Prague 1965, p. 110); Chmelir et al., J. Polymer Sci., C, 1967, 833–839; while all other Friedel-Crafts halide catalysts require water, an alkyl halide, a hydrogen halide, or a similar compound as a co-catalyst with which they can form a Lewis acid. They are ineffective in an anhydrous inert solvent.

Even aluminum bromide and aluminum iodide are effective catalysts for the polymerization of isobutylene in anhydrous inert media only if employed in large amounts, and are difficult to remove from the polymer.

SUMMARY OF THE INVENTION

We have now found that the catalytic effect of aluminum bromide and aluminum iodide in a medium free from co-catalysts is greatly enhanced by the simultaneous presence in the polymerization zone of a wide range of halides known to be effective in the Friedel-Crafts reaction, but not themselves capable of catalyzing the polymerization of isobutylene in the absence of a co-catalyst with which they could form a Lewis acid. The halides which we have found to activate aluminum bromide and aluminum iodide are titanium tetrachloride, titanium tetrabromide, vanadium tetrachloride, antimony pentachloride, tin tetrachloride, gallium trichloride, boron trifluoride, and bromine monoiodide. They substantially increase the polymerization rate of isobutylene in the presence of aluminum bromide or aluminum iodide by at least a factor of two, often by a factor up to ten, and sometimes of up to one hundred although they cannot themselves cause significant polymerization when present in the polymerization zone in the same amounts, as long as the polymerization zone is kept free from co-catalysts.

While the exact mechanism by which the afore-enumerated halides activate aluminum bromide and aluminum iodide is not known, it is believed that additional compounds are formed. The compound formed from $BF_3$ and $AlBr_3$ is a solid insoluble in hexane, heptane or other normally liquid inert solvent at concentrations in which $AlBr_3$ is soluble.

Aluminum bromide and aluminum iodide are consumed during the polymerization of the isobutylene, thereby permitting the polymerization rate to be controlled by suitably timed addition of the catalysts. The entire amount of activating compound may thus be mixed initially with the isobutylene in a liquid phase without initiating the polymerization of the olefin, the liquid phase consisting either of isobutylene alone or of a mixture thereof with an inert solvent such as one of the afore-mentioned alkanes.

The polymerization reaction is exothermic, and it is customary to withdraw thermal energy from the polymerization mixture during the reaction. If this is done, the temperature of the mixture may be held approximately constant in a very convenient manner by controlling the addition of the catalyst, that is, of aluminum bromide or iodide. Flash polymerization is readily avoided.

The amounts of catalyst and of activating compound necessary for polymerizing isobutylene at economically practical rates are minute, and so small that their removal from the polymer is not normally necessary. Normally, we employ $1 \times 10^{-5}$ to $1 \times 10^{-3}$ mol aluminum bromide or aluminum iodide per liter of the polymerization mixture, and use the aforementioned halides of titanium, vanadium, antimony, tin, gallium, and boron or bromine monoiodide in an amount of $1 \times 10^{-5}$ to $1 \times 10^{-2}$ mol per liter.

Other olefins simultaneously present form copolymers with isobutylene under the conditions of our method, and it will be understood that the term "polymerization" as employed herein does not exclude copolymerization with minor amounts of such other olefins, the same advantages being obtained. Saturated hydrocarbons, as a class, have no chemical effect on the catalytic polymerization, and are therefore the preferred solvents, if solvents are employed at all.

The properties of the polymer formed are affected by process variables in a generally known manner. The molecular weight decreases with increasing polymerization temperature and increases with increasing monomer concentration.

Other features, additional objects and many of the attendant advantages of this invention will readily be appreciated from the following detailed description of specific embodiments.

DESCRIPTION OF PREFERRED EMBODIMENTS

The following examples are further illustrative of this invention, and it will be understood that the invention is not limited thereto.

Example 1

A 0.1 molar solution of isobutylene in anhydrous heptane was mixed with enough titanium tetrachloride to make the concentration of the compound $4 \times 10^{-4}$ mol/liter. No polymerization took place. The mixture was then cooled to $-12.4°$ C. and aluminum bromide was added at a rate of about $6 \times 10^{-6}$ mol/liter minute in small batches until a total of $2 \times 10^{-4}$ mol/liter had been consumed.

The isobutylene was polymerized during the aluminum bromide additions at a rate varying between $0.35 \times 10^{-4}$ and $0.9 \times 10^{-4}$ mol/liter second.

When titanium bromide replaces the chloride in the above procedure, practically identical results are obtained.

Example 2

A 0.15 molar solution of isobutylene in anhydrous heptane was mixed with $1.6 \times 10^{-4}$ mol/liter titanium tetrachloride at $-44.6°$ C., and thereafter with $9.5 \times 10^{-5}$ mol/liter aluminum bromide. The polymerization which was started by the addition of the aluminum bromide proceeded at a rate of $3.5 \times 10^{-3}$ mol/liter second. The polymer formed had a molecular weight of 31,000 as determined from the viscosity of its solution.

When equimolecular amounts of stannic chloride, antimony pentachloride, and vanadium tetrachloride were substituted for the titanium tetrachloride at $-12°$ C., the polymers obtained had respective molecular weights of 560, 590, and 1080, as determined cryoscopically.

With lower catalyst concentrations, the polymerization proceeded at lower polymerization rates. A catalyst mixture of $2.9 \times 10^{-5}$ mol/liter titanium tetrachloride and $7.9 \times 10^{-5}$ mol/liter aluminum bromide caused polymerization at a rate of $0.5 \times 10^{-4}$ mol/liter second, and the molecular weight of the product was 920, as determined cryoscopically.

Example 3

An equimolecular solution of aluminum tribromide and titanium tetrabromide in anhydrous heptane, containing $3.2 \times 10^{-2}$ mol/liter of each catalyst, was added to a 0.15 molar solution of isobutylene in heptane in an amount sufficient to make the concentration of each catalyst in the mixture $7.8 \times 10^{-5}$ mol/liter.

The isobutylene polymerized at $-12.8°$ C. at a rate of $3.4 \times 10^{-4}$ mol/liter second. When the solution of the mixed catalysts was stored for some time, its activity decreased.

Example 4

Gaseous boron trifluoride was introduced at room temperature into a 0.03 molar solution of aluminum bromide in heptane until the solution was saturated with the gas. A solid material was formed and remained suspended or finely dispersed in the liquid.

1.2 ml. batches of the suspension were added to 80 ml. batches of a 0.3 molar solution of isobutylene in heptane which were held at various temperatures ranging from $-48.4°$ C. to $+26.1°$ C. The resulting polymerization of the isobutylene proceeded at a rate of $0.9 \times 10^{-4}$ mol/liter second at the lowest temperature and the polymer obtained had a molecular weight of 316,000 as determined from its viscosity. At the highest temperature, the polymerization rate was $11.0 \times 10^{-4}$ mol/liter second, and the resulting polymer had a molecular weight of 6,900. Intermediate temperatures produced intermediate values of polymerization rate and molecular weight.

Example 5

A 0.15 molar solution of isobutylene in heptane was mixed with $4 \times 10^{-3}$ mol/liter titanium tetrabromide, and no polymerization could be observed. When $1.5 \times 10^{-4}$ mol/liter aluminum bromide was added at $-12.3°$ C., the polymerization started at a rate of $0.7 \times 10^{-4}$ mol/liter second which gradually increased to $4 \times 10^{-4}$ mol/liter second. It then gradually decreased to a value of zero as the monomer was consumed.

As determined by viscosimetric methods, the average number molecular weight of the polyisobutylene produced was 2,000.

Example 6

80 ml. of a 0.1 molar solution of isobutylene in anhydrous heptane were mixed with a sufficient amount of titanium tetrachloride to make the concentration of the compound $4 \times 10^{-3}$ mol/liter without causing polymerization. When 2 ml. of heptane saturated with aluminum triiodide (about $2 \times 10^{-3}$ mol/liter) were added at $-15°$ C., a polyisobutylene was produced which had an average molecular weight of 1080, as determined cryoscopically.

Example 7

250 g. isobutylene dissolved in 80 g. hexane was polymerized at $+30°$ C. in an autoclave in the presence of 0.023 percent titanium tetrachloride and 0.020 percent aluminum bromide, the latter being added in eight batches of 0.0025 percent each, all percentage figures being based on the combined weight of the mixture. The conversion was 100%. The oily polymer obtained had an average number molecular weight of 1160, as determined cryoscopically.

Similar results were obtained when the hexane was omitted, and the polymerization mixture consisted of isobutylene and the catalysts only.

Example 8

Petroleum ether was purified by means of concentrated sulfuric acid, and 300 g. of a fraction boiling at 61° C. were employed as a solvent for 33 g. isobutylene. Three 3 ml. batches of the catalyst suspension prepared in Example 4 were added at intervals while the temperature of the polymerization mixture was kept between $+13°$ C. and 18° C. The polymerization was interrupted when the conversion amounted to 70%. The molecular weight of the product, as determined from the viscosity of a diluted sample, reached 21,000.

Example 9

A mixture of 310 g. isobutylene and 80 g. heptane containing 0.015% (by weight) titanium tetrachloride was enclosed in an autoclave, and polymerization was initiated by the gradual addition of aluminum bromide at $+60°$ C., 0.01% by weight being added over a period of 30 minutes, whereby 100% conversion of the isobutylene was achieved at a polymerization rate which could readily be controlled by external cooling of the autoclave with water having a temperature of 20° C.

The oil-like polymer obtained had an average number molecular weight of 750, as determined cryoscopically. The dynamic viscosity of the product was 14,400 centipoises.

Example 10

370 g. isobutylene without diluent were polymerized at $-25°$ C. in the presence of 0.01% titanium chloride by gradually adding 0.002% (by weight) aluminum bromide, the rate of additions being chosen to maintain the desired temperature.

When a conversion of 60% was achieved after two hours, the polymerization was interrupted. The product had an average molecular weight of 125,500 as determined by its viscosity.

When the same amount of isobutylene was polymerized in the presence of 0.015% titanium chloride at $+5°$ C. by the gradual addition of 0.006% aluminum bromide, the polymer obtained within 60 minutes had a molecular weight of 53,000, as determined by viscosimeter.

At $+28°$ C. and with 0.031 titanium tetrachloride and 0.013% aluminum bromide, the conversion reached 95% in 60 minutes, and the molecular weight of the polymer was 9200, as determined from its viscosity.

Example 11

A 0.1 molar solution of isobutylene in heptane was mixed with $6.2 \times 10^{-5}$ mol/liter aluminum tribromide and $15.3 \times 10^{-5}$ mol/liter gallium trichloride. The polymerization of the isobutylene proceeded at a rate of $2.4 \times 10^{-4}$ mol/liter second at $-15°$ C., and the polymer obtained had a molecular weight of 830, as determined cryoscopically.

When the polymerization was repeated without addition of the gallium chloride, the rate was extremely low ($6 \times 10^{-6}$ mol/liter second).

Example 12

A 0.1 molar solution of isobutylene in heptane was mixed sequentially with $6.6 \times 10^{-5}$ mol/liter aluminum bromide and $3.38 \times 10^{-4}$ mol/liter bromine monoiodide. The isobutylene was polymerized at a rate of $6 \times 10^{-5}$ mol/liter second at $-15°$ C. The polymer formed had a molecular weight of 675, as determined cryoscopically.

The bromine iodide thus increased the polymerization rate tenfold as compared to that obtained under the same conditions with aluminum bromide alone while lacking significant catalytic efficiency of its own in the anhydrous system employed.

Example 13

39.5 g. isobutylene without diluent were cooled to $-78°$ C., and a solution of 7.8 mg. titanium chloride in 0.068 gram heptane were added to make the titanium chloride concentration in the mixture 0.02%. No polymerization occurred. A solution of 1.3 mg. aluminum tribromide in 0.8 g. heptane was added to the mixture over a period of 20 minutes in six small batches at intervals chosen to keep the temperature at or below 65° C. while the reaction vessel was immersed in a cooling bath having a temperature of $-78°$ C.

The polymer separated spontaneously from the remainder of the mixture which consisted essentially of unreacted monomer and was separated from the polymer for reuse in a later run.

The polymer weight 8.6 g., and had a molecular weight of 1,921,000, as determined from its viscosity ($\eta = 3.80$) in n-heptane at 20° C.

Example 14

The procedure of Example 13 was repeated with minor variations, using aluminum triiodide instead of the tribromide.

39.5 g. isobutylene were cooled to $-78°$ C. and mixed with a solution 9.8 mg. titanium tetrachloride in 0.068 g. heptane. A solution of 5.7 mg. aluminum triiodide in 1.17 g. heptane was added in small batches as in Example 13, and the polymer formed within 15 minutes separated spontaneously from the unreacted monomer. It weighed 9.3 g. and had a molecular weight of 1,340,000, as calculated from its viscosity in n-heptane at 20° C.

Example 15

A mixture of 22.2 g. heptane, 8.8 mg. titanium tetrachloride, and 6.7 mg. aluminum bromide was formed in a polymerization flask immersed in a bath having a temperature of 20° C. Within an hour, 37.5 g. isobutylene, 8.8 mg. titanium tetrachloride, and 6.7 g. aluminum bromide were added gradually at such a rate as to keep the temperature in the flask at or below 40° C.

28.3 g. oily isobutylene having a dynamic viscosity of 500 centipoise were recovered by distillation of the solvent from the reaction mixture.

Analogous results were obtained when the heptane was replaced by a polyisobutylene of low molecular weight. The reaction was carried out continuously, a portion of the polymer being discharged from the flask from time to time while additions of the catalysts and of isobutylene continued. The step of separating the solvent from the polymer was thereby avoided.

The reaction conditions described above may be varied to produce polyisobutylene of low or medium viscosity at higher or lower temperatures respectively. Operation at lower temperature permits the use of open reaction vessels and requires relatively slow addition of the isobutylene. In a pressure vessel capable of withstanding gage pressure of 0.1–0.4 atmosphere, the polymerization temperature and the rate of isobutylene addition may be increased.

Example 16

A mixture prepared from 40 g. isobutylene, 1.25 g. isoprene, and a solution of 9.7 mg. titanium tetrachloride in 0.22 g. heptane in a flask immersed in a bath at $-78°$ C. was stable, and no polymerization occurred. Over a period of 25 minutes, a solution of 2.4 mg. aluminum tribromide in 0.34 g. n-heptane was added in four batches timed to keep the temperature of the mixture at or below $-65°$ C.

The polymer formed separated from a layer of unreacted monomer whose viscosity did not significantly change. When separated from the monomer, the rubbery polymer weighed 7.45 g. It was only sparingly soluble in heptane, indicating substantial cross-linking by copolymerization of the isobutylene with the isoprene.

Example 17

A $C_4$-fraction obtained by careful fractionation of cracked petroleum was purified to remove dienes and washed with water. It then consisted of 46% isobutylene, 24% 1-butene, 14% cis- and trans-2-butene, a small residue (about 0.5%) of dienes, n-butane, isobutane, trace amounts of acetylene homologs, and of nitrogenous compounds.

42 g. of the aforedescribed partly purified mixture were cooled to $-78°$ C. and mixed with a solution of 8.8 mg. titanium chloride in 0.20 g. heptane which did not initiate any change. Over a period of 45 minutes, 5.3 mg. aluminum tribromide dissolved in 0.82 g. heptane were added in eight small batches without raising the temperature above $-65°$ C.

The polymer obtained was soluble in the reaction medium, and a viscous solution was produced when the polymerization was terminated upon 50% conversion. The polymer had a molecular weight of 243,000, as calculated from a viscosity of $\eta = 1.01$ in n-heptane at 20° C.

At a temperature of $-49°$ C., a polymer having a molecular weight of 104,000 was obtained under otherwise the same conditions ($\eta = 0.585$). The molecular weight was further reduced to 36,600 ($\eta = 0.390$) by polymerization at $-28°$ C., and ultimately to 15,900 ($\eta = 0.176$) when the temperature was held at $-8°$ C.

While the invention has been described with particular reference to specific embodiments, it is to be understood that it is not limited thereto, but is to be construed broadly and restricted solely by the scope of the appended claims.

We claim:

1. In a method of polymerizing isobutylene in a polymerization zone in the presence of an effective amount of a catalyst selected from the group consisting of aluminum bromide and aluminum iodide, the improvement which comprises:
   (a) activating said catalyst by the simultaneous presence in said zone of an effective amount of a compound selected from the group consisting of titanium tetrachloride, titanium tetrabromide, vanadium tetrachloride, antimony pentachloride, tin tetrachloride, gallium trichloride, boron trifluoride, and bromine monoiodide,
      (1) said compound being present in said zone in an amount insufficient to cause polymerization of said isobutylene in the absence of a cocatalyst capable of forming a Lewis acid with said compound; and (b) keeping said zone substantially free of said cocatalyst.

2. In a method as set forth in claim 1, the amount of said compound being at least sufficient to increase the polymerization rate of said isobutylene by a factor of two as compared to the polymerization rate in the presence of said catalyst and in the absence of said compound.

3. In a method as set forth in claim 1, said compound being mixed in a liquid phase with said isobutylene in the absence of said catalyst, and the catalyst being thereafter added to said liquid phase, the liquid phase being a member of the group consisting of isobutylene and a mixture of isobutylene with an inert solvent.

4. In a method as set forth in claim 3, thermal energy being withdrawn from said liquid phase during the polymerization of said isobutylene, and said catalyst being added to said liquid phase at a rate to keep the temperature of said liquid phase within a predetermined range.

5. In a method as set forth in claim 3, said compound being titanium tetrachloride, and said catalyst being added to said liquid phase while dissolved in an inert solvent.

6. In a method as set forth in claim 1, said catalyst being aluminum bromide and said compound being boron trifluoride, said aluminum bromide being mixed with said boron trifluoride in a normally liquid inert solvent whereby a solid is precipitated from said medium, said solid being introduced into said zone in finely dispersed form.

7. In a method as set forth in claim 1, said isobutylene being polymerized in a substantially liquid polymerization mixture essentially consisting of said isobutylene, said catalyst, said compound, and an inert solvent, said catalyst being present in an amount of $1 \times 10^{-5}$ to $1 \times 10^{-3}$ mol per liter of said mixture, and said compound being present in an amount of $1 \times 10^{-5}$ to $1 \times 10^{-2}$ mol per liter.

References Cited
UNITED STATES PATENTS

| | | | |
|---|---|---|---|
| 3,296,237 | 1/1967 | Coen et al. | 260—93.5 |
| 3,324,094 | 6/1967 | Tanaka et al. | 260—88.2 |
| 3,325,424 | 6/1967 | Tornqvist et al. | 252—442 |
| 3,455,890 | 7/1969 | Davidson et al. | 260—85.3 |

JAMES A. SEIDLECK, Primary Examiner

R. A. GAITHER, Assistant Examiner

U.S. Cl. X.R.

260—88.2